United States Patent [19]

Nelson

[11] Patent Number: 4,523,266

[45] Date of Patent: Jun. 11, 1985

[54] AC TO DC CONVERSION SYSTEM WITH CURRENT SPREADING CIRCUIT

[75] Inventor: Dale H. Nelson, Natick, Mass.

[73] Assignee: Prime Computer, Inc., Framingham, Mass.

[21] Appl. No.: 466,331

[22] Filed: Feb. 14, 1983

[51] Int. Cl.³ .......................................... H02P 13/24
[52] U.S. Cl. ...................................... 363/26; 363/37; 363/48; 363/70
[58] Field of Search ...................... 363/26, 36, 37, 45, 363/97, 47, 48, 70

[56] References Cited

U.S. PATENT DOCUMENTS 4,319,317  3/1982  Fukui et al. ........................... 363/37
4,330,816  5/1982  Imazeki et al. ....................... 363/26

FOREIGN PATENT DOCUMENTS 1219437  1/1971  United Kingdom .................. 363/45

OTHER PUBLICATIONS

Goyal et al., "Miniaturization of Thyristorized Power Supplies Using Pulse Width Modulation Techniques", Journal of the Institution of Electronics and Telecommunication Engineers, vol. 22, No. 6, pp. 402–405, Jun. 1976, (India).

Williams, "Exploit D/A Converters in Unusual Controller Design", EDN, pp. 111–116, Nov. 25, 1981.

Primary Examiner—William H. Beha, Jr.
Attorney, Agent, or Firm—Wolf, Greenfield & Sacks

[57] ABSTRACT

A power supply circuit having a higher power factor and decreased current crest factor. The circuit preferably comprises an input circuit for receiving an input AC voltage and rectifying this voltage and an output circuit for providing a DC output voltage. A pulse-width-modulation circuit intercouples between the input and output circuits and includes a controlled circuit adapted to pass input AC current in pulse-wide increments with the pulse-width varying in inverse proportion to the AC voltage. In this manner, when the instantaneous AC voltage is low, the pulse widths are wider and conversely when the voltage is high, the pulse widths are narrower. In one version of the invention, the pulse width modulation is carried out by a programmed variable ratio transformer. In one preferred embodiment of the present invention, the current spreading circuit is of a quasi cosecant type while in another preferred embodiment of the invention, there is a combination of pulse-width-modulation with a typical input filter circuit including an OR circuit at the output to provide the necessary combining.

4 Claims, 7 Drawing Figures

AC TO DC CONVERSION SYSTEM WITH CURRENT SPREADING CIRCUIT

BACKGROUND OF THE INVENTION

The present invention relates in general to a current spreading circuit which in a preferred version is embodied in a DC power supply circuit characterized by improved (higher) power factor and decreased current crest factor. More particularly, the present invention relates to a pulse width modulation (PWM) current spreading circuit, which in one embodiment is implemented by the addition of a relatively simple control circuit to the standard rectifier and storage capacitor power supply circuit.

Steady-state operation of AC operated power supplies having the usual rectifier-capacitor input circuit, is characterized by an undesirable current peak which occurs at the maximum amplitude excursion of the sine voltage waveform. This peak current is due to energy transfer occurring only when the input sine wave voltage is higher than the sum of the rectifier drop and the capacitor voltage. Refer to FIG. 5 which will be described in further detail hereinafter. The time of energy transfer is typically 40° to 60° out of 180° resulting in a high peak current as noted. Such peak currents are of concern, not only to power supply designers and users, but also to the power generation and transmission operators and customers sharing the same distribution source of electrical power.

The effect of these peak currents provides for undesired low power factor and increased current crest factor causing excessive current to be drawn for a given watt level, with VA values being substantially larger than watt values. In this connection, the current crest factor is defined as the ratio of the peak current to the RMS value of the current. Crest factors may be in the range of 3 to 4 and run as high as 10 and possibly even higher.

Accordingly, it is an object of the present invention to provide a circuit for providing current spreading to provide improvement in power factor. In its simplest terms, there is a mitigation of the current crest so as to redistribute the rectified AC input current drawn over a greater portion of the 180° half wave. Ideally, the power supply and its load is to present an $I_{in} = \sin \theta$ view to the source, if it is to be a resistance equivalent. The redistribution of the rectified AC input current drawn generally requires the transfer of energy to the DC output bus of the power supply and takes place when the instantaneous voltage of the input AC sine wave is lower than the voltage on the DC output bus.

Another object of the present invention is to provide a pulse-width-modulation (PWM) current spreading circuit in accordance with the preceding object and which is relatively simple in design and which can be implemented without any substantial increase in cost as far as the overall cost of the power supply circuit is concerned.

SUMMARY OF THE INVENTION

To accomplish the foregoing and other objects of this invention, there is provided a current spreading circuit adapted to provide redistribution of the rectified AC input current so that the current is drawn over a greater portion of the 180° half wave. The circuit comprises an input circuit means for receiving an input AC voltage and rectifying the AC voltage, output circuit means for providing a DC output voltage, and pulse-width-modulation means intercoupled between the input circuit and the output circuit means and comprising means adapted to pass input rectified AC current in pulse width increments with the pulse width varying in inverse proportion to the AC voltage. The operation is such that when the instantaneous AC voltage is low, the pulse widths are wider and conversely when the voltage is high, the pulse widths are narrower. This has the effect of providing current spreading and thus reducing the current peak associated with prior art power supply circuits. The pulse-width-modulation means preferably comprises switching means and associated control means for controlling the switching means. More particularly, the pulse width modulation means may comprise a pulse width modulation (PWM) generator having feedback means associated therewith responsive to output voltage, or in an alternate construction, responsive to rectified AC input voltage. The aforementioned switching means is preferably an electronic switch such as a transistor or pair of transistors and associated circuit drive means coupled from the PWM generator to the switching means for controlling conduction of the preferred transistor switches. The drive circuit means may comprise a base drive transformer. In a preferred embodiment of the present invention there are provided a pair of switching transistors connected in combination with a step-up transformer which is coupled intermediate the transistors and output circuit means. This transformer preferably has a pair of primary windings and a secondary winding. The output circuit means may include an output bridge and inductor-capacitor circuit with the capacitor functioning as a storage capacitor. In one circuit described herein, there is provided a combination circuit using the current spreading technique of this invention in combination with the usual input inductance and storage capacitance. This circuit also includes an OR circuit preferably comprising a pair of diodes so as to provide a combined output DC signal. This circuit has the effect of adding the reduced mid-point line current peak to the PWM line current quasi cosecant curve so as to provide a new line current curve that is of three peaks.

Also, in accordance with a further aspect of the present invention, there is provided a method of current distribution in a power supply circuit having a rectified input AC voltage signal and means for providing DC voltage output. This method comprises steps of selecting pulse width increments of rectified input AC current with pulse width varying in inverse proportion to the AC voltage whereby when the instantaneous AC voltage is low the pulse widths are wider and when the voltage is high, the widths are narrower. This method comprises the preferred step of providing pulse width modulation of a higher frequency than the AC cycle.

BRIEF DESCRIPTION OF THE DRAWINGS

Numerous other objects, features and advantages of the invention should now become apparent upon a reading of the following detailed description taken in conjunction with the accompanying drawing, in which.

DETAILED DESCRIPTION

Figure 1:
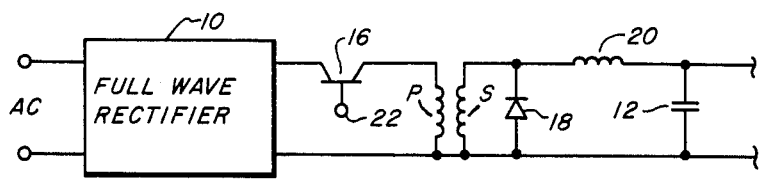
FIG. 1 shows a simplified embodiment of the present invention employing what may be termed a programmed variable ratio transformer.
Figure 3:
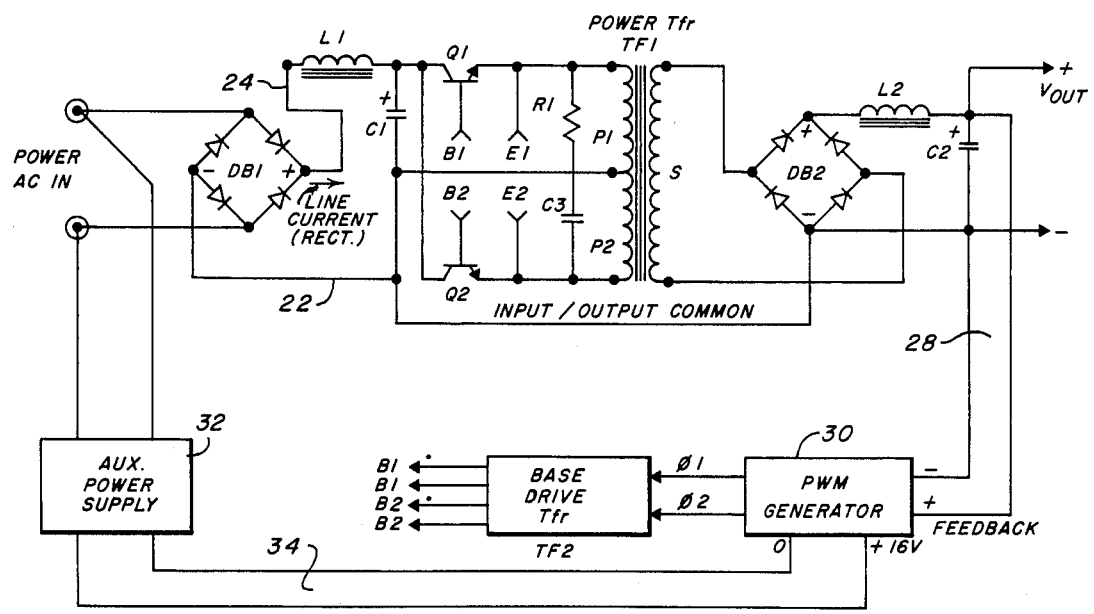
FIG. 3 illustrates another embodiment of the present invention in which the current spreading circuit may be referred to as of quasi cosecant type.
Figure 4:
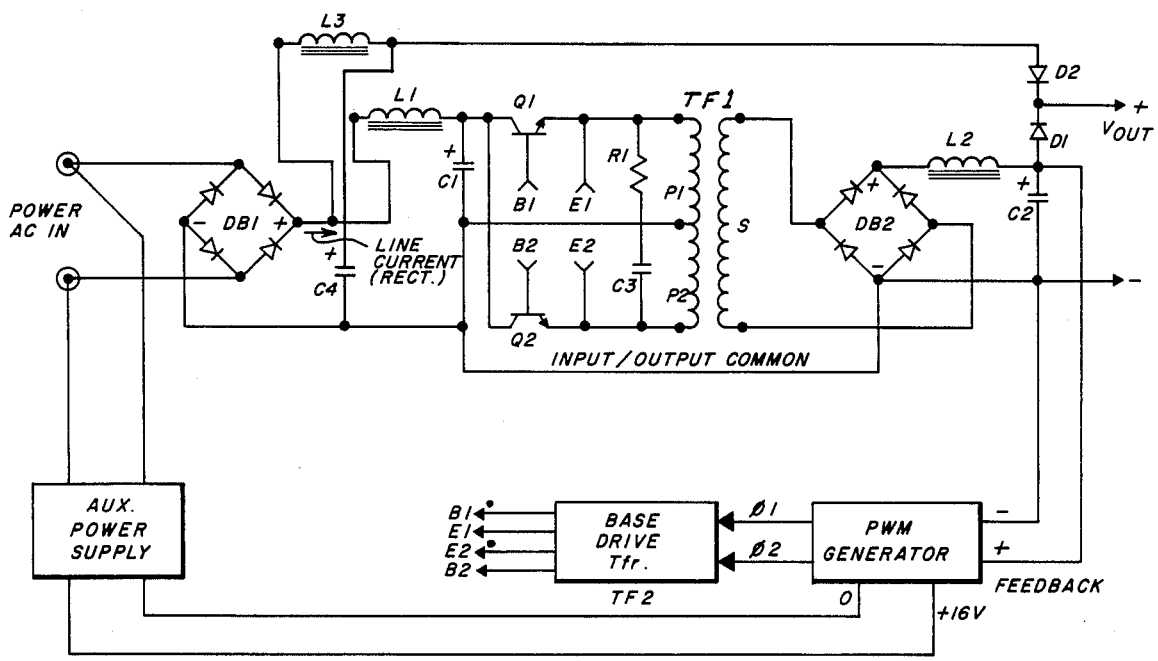
FIG. 4 is still another circuit embodiment of the present invention which combines the pulse width modulation current spreading circuit with a typical input filter circuit.

With reference to the drawings, there is shown herein three different embodiments of the present invention. The more simplified version of the invention is illustrated in FIG. 1 while FIGS. 3 and 4 show alternate embodiments. All of these circuits operate on the principle of redistributing the rectified AC input current that is drawn over a greater portion of the 180° half wave; thus the use of the term "current spreading circuit".

FIG. 1 shows the first embodiment of the present invention in which the current spreading is carried out by means of a network coupled between the standard full wave rectifier 10 and storage capacitor 12. This network enables the storage capacitor which is normally charged by an AC voltage from the rectifier 10, to receive charge instead during a much larger portion of the AC cycle thus increasing the efficiency of the circuitry and decreasing expensive peak current values that are required in prior art circuits. See FIG. 5 which shows this peak line current.

Figure 5:
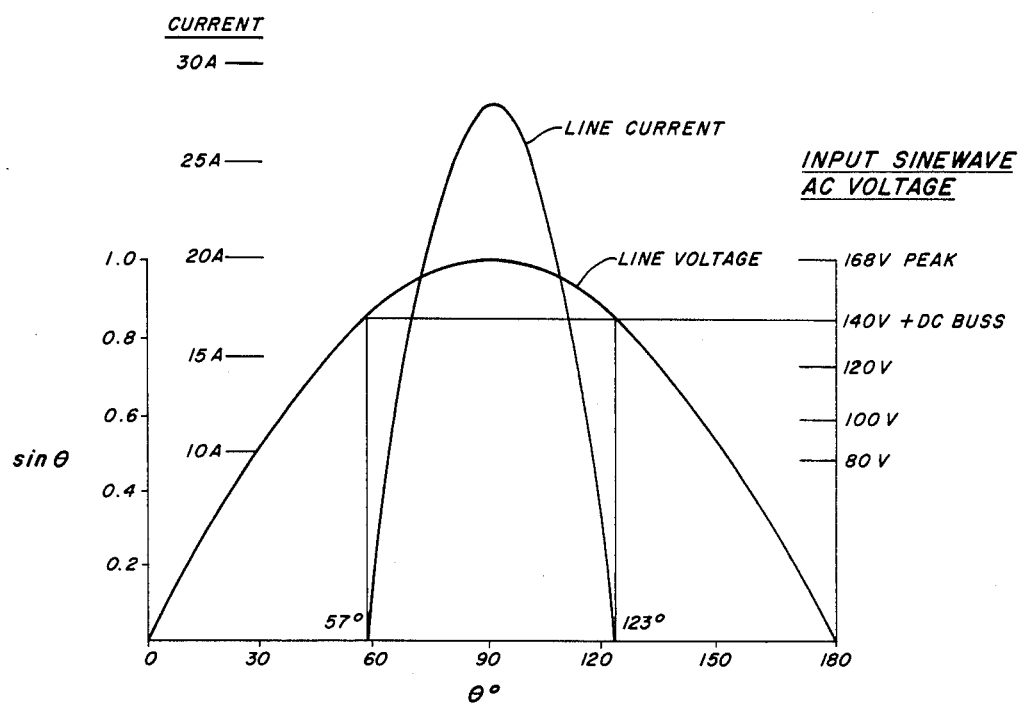
FIG. 5 shows representative waveforms of line current and line voltage illustrating the prior art problem of excessive crest factor.

In FIG. 1 the network that provides this current spreading includes what is referred to herein as a programmed variable ratio transformer 14 coupled between the full wave rectifier 10 and the storage capacitor 12. The circuitry also includes a bipolar control transistor 16, secondary winding diode 18, and inductor 20. The transformer 14 is shown as having respective primary and secondary windings P and S. This network has the ability to essentially multiply the AC voltage supplied to the capacitor 12 by an amount that varies inversely with the AC voltage amplitude thus insuring that during a relatively large portion of the AC cycle, the voltage produced by the transformer is at a relatively constant voltage sufficiently higher than that of the storage capacitor so as to supply charge to the storage capacitor. This overcomes the problem of the prior art circuit in which the instantaneous voltage of the AC signal is higher than that of the storage capacitor only during the peak of the AC cycle. In FIG. 5 note the relatively small portion of the overall cycle during which the line current exceeds the storage capacitor voltage.

It is noted that the transistor 16 has control thereof coupled at the input terminal 22 which connnects to the base of the transistor 16. The collector of transistor 16 couples to the rectifier 10 while the emitter thereof couples to the primary winding of the transformer 14. The transformer 14 may be considered as a pulse-width-modulated switching transformer similar to the type used to correct for slight changes in supply voltage in some switching power supplies. This transformer is preferably a step-up transformer. It is noted that the collector-emitter path of the transistor 16 couples from the full wave rectifier 10 to the primary winding P of the transformer.

The base of the switching transistor 16 is supplied with a high frequency pulse-width-modulated signal, the pulse width of which varies in inverse proportion to the AC voltage amplitude. In this regard refer to FIG. 2 which shows 180° of the waveform with the high frequency modulation. It is readily seen from FIG. 2 that when the instantaneous AC voltage is low, the pulses supplied to the transistor 16 are long, allowing most of the stepped-up voltage produced at the secondary S of transformer 14 to pass through the choke coil or inductor 20 to the storage capacitor. Note in FIG. 2 the time period $t_0$ with a normalized width of 100.

Figure 2:
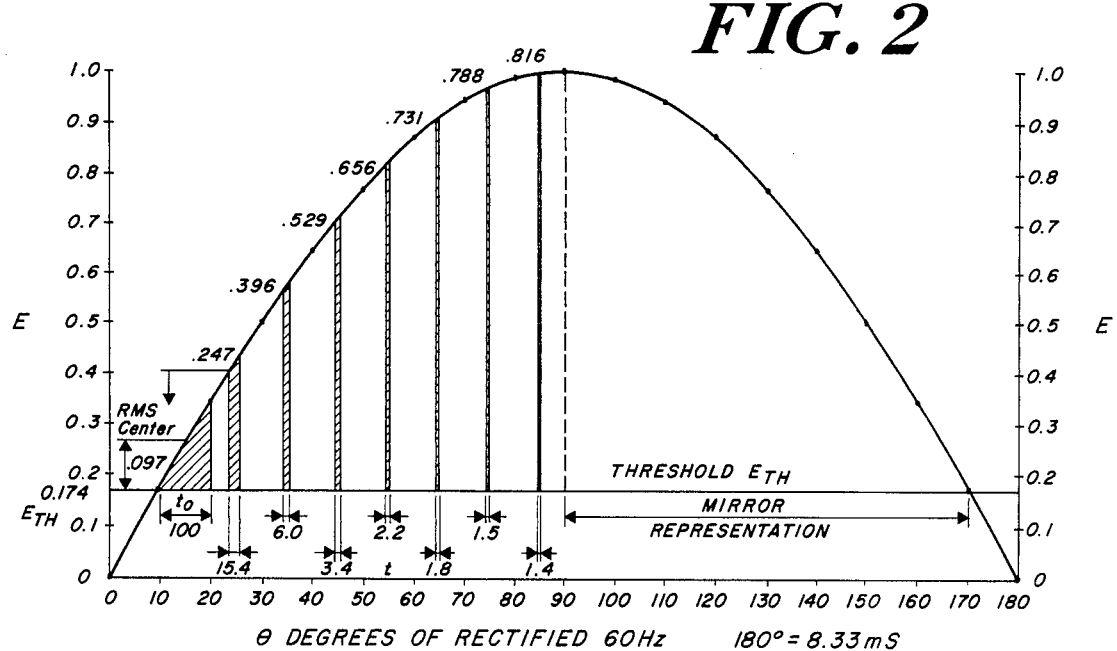
FIG. 2 is a waveform of one 180° cycle illustrating the pulse modulation as it applies to the circuits of this invention described herein.

On the other hand, when the instantaneous voltage is high, as noted in FIG. 2, the pulses supplied to the transistor are of less width and thus even though the output of the stepped-up transformer increases in correspondence with the AC voltage, the output of the inductor 20 remains relatively constant, since the higher voltages produced by the step-up transformer does not have time to pass through the inductor through the shortened pulse caused by the reduced conduction time of the switching transistor 16. This has the net effect of spreading the current coupled to the storage capacitor 12.

It is also noted in FIG. 2 that for the sake of clarity, the high frequency modulation is shown at 1 KHz. However, typical modulation would be at 25 KHz in which case there would be 25 times as many pulses as illustrated in FIG. 2, each of 1/25 the width shown.

A known circuit may be used coupled to the control terminal 22 shown in FIG. 1 for providing the form of pulse width modulation described herein. For example, a standard pulse width modulation generator may be employed, adapted to operate at say 25 KHz but having a variable pulse width in which the control of pulse width is carried out so that the width is inversely proportional to the input AC voltage. Again, FIG. 2 clearly shows the manner of control that is desired in accordance with the invention. It is also noted in FIG. 2 that a threshhold voltage is shown at a normalized voltage of 0.174. This threshhold is used to avoid the concept of 0 volts and infinite current at the 0° and 180° points. This voltage offset may be furnished by means of a small input capacitor.

Figure 6:
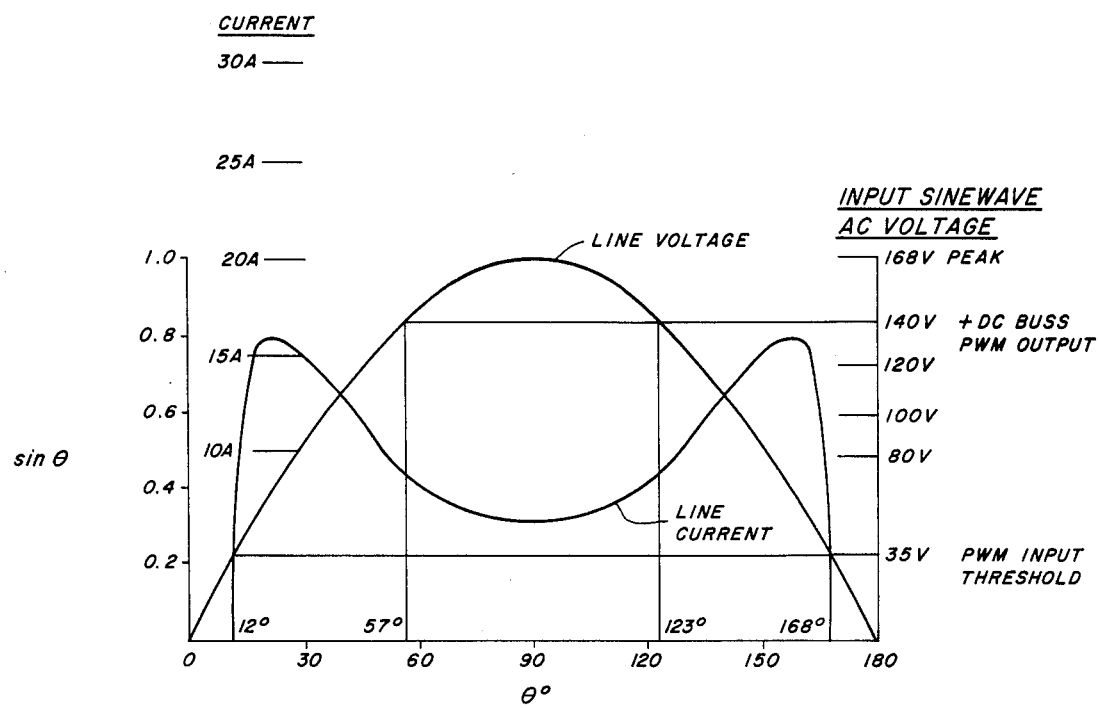
FIG. 6 shows the line voltage and line current waveforms associated with the circuit of FIG. 3.

Preferred embodiments of the present invention are illustrated in FIGS. 3 and 4. In the embodiment of FIG. 3 the redistribution of input current that is drawn is again carried out by means of a pulse width modulation technique in which the rectified input AC voltage at line 24 is treated as a slowly (but cyclically) changing DC source which couples to the input of a pulse width modulation circuit which comprises power transformer TF1 and bipolar switching transistors Q1 and Q2. The voltage gain of the PWM circuit is cyclically changed in phase with the rectified input AC voltage in a manner so that the gain is high at low input AC voltages and low at high input AC voltages. Again, reference is made to the waveform of FIG. 2 which is a typical representation of the variation of pulse widths. This shows that at low input AC voltages, the pulse width is wide for high gain, and alternatively at high input AC voltages, the pulse width is narrow for low gain. In connection with the circuit of FIG. 3, reference is also made to FIG. 6 which shows the waveforms for line voltage and line current. It is also noted in the circuit of FIG. 3 that this is an embodiment that does not use the storage capacitor mentioned previously and shown in the embodiment of FIG. 1 as storage capacitor 12. As is illustrated in FIG. 6, with the circuit of FIG. 3, the current spreading occurs so that the line current is highest near the 0° and 180° limits of the 180° half wave, and lowest at the 90° midpoint. This is termed herein as a circuit of quasi cosecant type in that it has a modified inverse relationship to the input AC voltage sine wave.

The circuit of FIG. 3 includes an input diode bridge DB1 which provides for input full wave rectification with the rectified signal output being on line 24. The diode bridge DB1 is conventional including the standard four diodes interconnecting in a bridge arrangement. The output of the rectifier couples by way of line 24 to a low pass filter which is comprised of inductor or choke L1 and capacitor C1. The inductor L1 intercouples the line 24 to the collectors of transistors Q1 and Q2. The capacitor C1 couples from the transistor side of inductor L1 to the input/output common line 26. The capacitor C1 is not analogous to the storage capacitor 12 shown in FIG. 1 but is part of the low pass filter which blocks the typically 50 KHz pulses from entering the input AC line from the control transistors Q1 and Q2. The capacitor C1 has substantially no storage function as far as DC is concerned.

The power transformer TF1 has a pair of primary windings P1 and P2 and a single secondary winding S. The emitter of transistor Q1 couples to the primary winding P1 while the emitter of transistor Q2 couples to the primary winding P2. There is a center tapped line between the primary windings that couples to the common line 26. With regard to the power control transistors Q1 and Q2, it is noted that there are respective base and emitter signals coupling thereto for the control thereof. These include signals B1 and E1 and signals B2 and E2. These signals couple from the base drive transformer TF2 to be described hereinafter. The power transformer TF1 is a step-up transformer having associated therewith transient suppression provided by resistor R1 and capacitor C3. Resistor R1 and capacitor C3 are connected in series between the emitters of the respective transistors Q1 and Q2.

The circuit of FIG. 3 also includes at its output, the fast recovery output bridge DB2 which is also comprised of four diodes interconnected in the conventional manner to provide full wave bridge operation. This bridge couples from the secondary winding S and has its output coupled to inductor L2 and associated output capacitor C2. The output DC voltage is taken across the storage capacitor C2. This same voltage is also coupled by way of feedback lines 28 to the pulse width modulation (PWM) generator 30. The PWM generator 30 includes drive circuitry for the base drive transformer TF2 and voltage sensing circuitry for sensing the voltage on the input control lines 28. FIG. 3 also shows the auxiliary power supply 32 which is used for supplying power to the PWM generator 30 and indirectly to the base drive transformer TF2.

There are basically two outputs from the base drive transformer TF2 for applying alternating closure base currents to transistors Q1 and Q2, with pulse widths of these drive pulse signals being determined by the signals from the PWM generator under the feedback control from the output voltage as sensed at lines 28 coupling to the PWM generator. It is noted in FIG. 3 that there is shown an absence of the usual input storage capacitor coupling from the diode bridge DB1. This has the effect of resulting in no current peak of the type shown in FIG. 5, and resulting in the full rectified AC input voltage half sine wave being applied directly to the power control transistors Q1 and Q2. As indicated previously, the capacitor C1 is part of the lowpass filter and has substantially no storage function from a DC standpoint.

In FIG. 3 because of the absence of the storage capacitor at the input, the output of the rectifier may be considered as a DC signal that is of a slow but cyclically changing voltage changing from 0 to a peak voltage. This voltage is stepped-up typically four times by means of the power transformer TF1. This voltage is then rectified by the output bridge DB2 and applied to the output inductor L2 and output capacitor C2. The output voltage at lines 28 which carries the rectified input AC envelope, is the feedback source for the PWM generator 30 which then provides the variable width base drives to the power control transistors Q1 and Q2. This base drive radically reduces the input AC modulation on the output voltage to a low percentage of the output voltage. The sensing provided by the PWM generator 30 may be adapted to function only on the AC modulation of the output voltage, or it may be arranged to also function on the DC value of the output voltage, thus furnishing DC output regulation.

With reference now to FIGS. 3 and 6, it is noted that there is an assumption that the output DC bus is at a value of 140 volts. It is also assumed that the output transformer TF1 has a step-up ratio of 4. This thus means that the rectified AC input voltage has a threshhold value of 140/4=35 volts, corresponding to a phase of 12° and 168° as noted in FIG. 6. At these points, charging of the output capacitor C2 begins and ends, respectively and similarly AC line current also begins and ends, respectively. By lowering the threshhold voltage below 35 volts, so as to approach 0 volts, one could more closely approach the cosecant line current curve, but impractical high AC input current and high output transformer secondary voltages would result. Therefore, the quasi cosecant curve of FIG. 6 is acceptable for practical purposes.

A theoretical derivation for the shape of the AC input current being that of a cosecant function is now given herein, assuming 60 Hz AC power and 25 KHz pulse width modulation. Where the output instantaneous power is constant and equal to say $K_1$ over a constant load and a regulated DC output bus voltage; the input instantaneous power (at frequencies up to 10 KHz) is also substantially constant and equal to $v \times i = K_2$, $v = K_3 \sin \theta$ and $i = K_4/\sin \theta = K_4$ cosecant $\theta$.

The line current curve in FIG. 6 deviates from the theoretical cosecant curve due the aforementioned pulse width modulation threshhold and also due to the input/output control characteristics of the PWM generator 30, which is not completely linear. It is apparent that means to linearize the latter control characteristics may be applied if desired.

Figure 7:
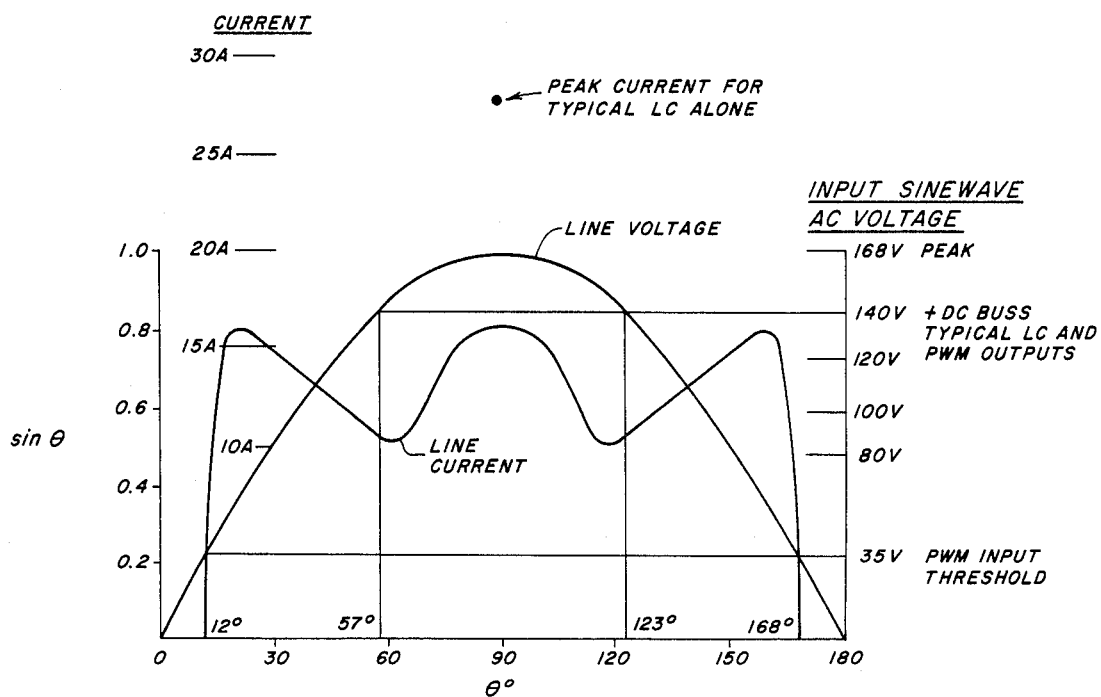
FIG. 7 shows the line voltage and line current waveforms associated with the circuit of FIG. 4.

The circuit illustrated in FIG. 3 has thus accomplished a radical reduction of the mid-point peak current as is quite evident from the curve of FIG. 6, and has shifted line current peaks towards 0° and 180° ends of the half wave. However, in order to provide more uniform current spreading in one circuit, reference is now made to FIG. 4. In FIG. 4 many of the same components are used and are similarly identified with respect to the circuit of FIG. 3. However, in FIG. 4, there have been added the input inductance L3 and the relatively large storage capacitor C4. These components are added to the output DC at the output of the circuit with diodes D2 and D1 arranged in an OR configuration. This has the effect of varying the mid-point line current peak as illustrated in FIG. 7. The curve of FIG. 7 is in a sense a composite of the curves shown in FIGS. 5 and 6. The two curves of FIGS. 5 and 6 have mutually raised the low point of the quasi cosecant curve and lowered the high point of the typical LC input filter, to provide current spreading over more than 80% of the half wave. The circuit is furnishing current during the time when the typical LC input filter circuit is not conducting, as determined by the OR connection of the diodes D1 and D2.

Having now described a limited number of embodiments of the present invention, it should be apparent to those skilled in the art that numerous other embodiments are contemplated as falling within the scope of this invention. For example, the power control devices have been described herein as bipolar transistors, however, these may be replaced by other control devices such as power FET's or Darlington's. Also, although the feedback shown is from the DC output in the embodiments of FIGS. 3 and 4, other types of feedback or program control may be employed, such as from the rectified AC input voltage, particularly in an embodiment such as illustrated in FIG. 1.

What is claimed is:

1. A current spreading circuit comprising;
    input circuit means for receiving an input AC voltage and rectifying said AC voltage,
    output circuit means for providing a DC output voltage,
    and pulse-width-modulation means intercoupled between said input circuit means and said output circuit means and comprising means adapted to pass input AC current in pulse width increments with the pulse width varying in inverse proportion to the AC voltage,
    whereby when the instantaneous AC voltage is low the pulse widths are wider and when the voltage is high the pulse widths are narrower,
    said pulse-width-modulation means comprising a pulse-width-modulation (PWM) generator having feedback means responsive to output voltage, electronic switch means and drive circuit means coupled from said PWM generator to said switch means for controlling conduction of said switch means,
    said drive circuit means including a base drive transformer,
    said electronic switch means comprising a pair of transistors,
    said pulse-width-modulation means further comprising a transformer coupled from said transistors to said output circuit means,
    said transformer having a pair of primary windings and a secondary winding,
    said output circuit means including an output bridge and an inductor-capacitor circuit with the capacitor functioning as a storage capacitor,
    and a second inductor-capacitor circuit at the output of said means for rectifying.

2. A current spreading circuit as set forth in claim 1 including an OR circuit at the output of the output circuit means for receiving a signal from either of the inductor-capacitor circuits.

3. A current spreading circuit as set forth in claim 2 wherein the OR circuit includes a pair of diodes providing a three peak current curve.

4. A current spreading circuit as set forth in claim 3 wherein said means for rectifying includes an input diode bridge.

* * * * *